(12) United States Patent
Gibson et al.

(10) Patent No.: US 9,643,588 B2
(45) Date of Patent: May 9, 2017

(54) METHOD AND SYSTEM FOR CONTROLLING CATALYST TEMPERATURE

(71) Applicant: Ford Global Technologies, LLC, Dearborn, MI (US)

(72) Inventors: Alex O'Connor Gibson, Ann Arbor, MI (US); Jeffrey Allen Doering, Canton, MI (US); Dennis Craig Reed, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 224 days.

(21) Appl. No.: 14/316,659

(22) Filed: Jun. 26, 2014

(65) Prior Publication Data

US 2014/0309080 A1  Oct. 16, 2014

Related U.S. Application Data

(63) Continuation of application No. 13/663,723, filed on Oct. 30, 2012, now Pat. No. 8,784,264.

(51) Int. Cl.
| | |
|---|---|
| *B60W 10/02* | (2006.01) |
| *B60W 10/06* | (2006.01) |
| *B60K 6/48* | (2007.10) |
| *B60W 20/16* | (2016.01) |

(52) U.S. Cl.
CPC ............. *B60W 10/02* (2013.01); *B60K 6/48* (2013.01); *B60W 10/06* (2013.01); *B60W 20/16* (2016.01); *B60K 2006/4825* (2013.01); *B60W 2710/0694* (2013.01); *Y02T 10/6221* (2013.01); *Y02T 10/6252* (2013.01); *Y10T 477/26* (2015.01); *Y10T 477/6395* (2015.01); *Y10T 477/747* (2015.01); *Y10T 477/79* (2015.01)

(58) Field of Classification Search
CPC ................................. B60W 20/16; B60K 6/48
See application file for complete search history.

(56) References Cited

U.S. PATENT DOCUMENTS

| | | | |
|---|---|---|---|
| 4,458,484 | A | 7/1984 | Toryu et al. |
| 6,059,689 | A | 5/2000 | Shimizu et al. |
| 6,119,453 | A | 9/2000 | Motose et al. |
| 6,935,989 | B2 | 8/2005 | Shibagaki |
| 7,007,464 | B1 | 3/2006 | Asami et al. |
| 7,707,822 | B2 | 5/2010 | Katoh et al. |
| 8,574,123 | B2 | 11/2013 | Nedorezov et al. |
| 8,591,379 | B2 | 11/2013 | Gibson et al. |
| 2007/0204594 | A1 | 9/2007 | Ishii |
| 2008/0161156 | A1 | 7/2008 | Kobayashi |
| 2012/0014410 | A1 | 1/2012 | Kachi et al. |
| 2013/0231809 | A1 | 9/2013 | Mamiya et al. |
| 2014/0222275 | A1* | 8/2014 | Ohsumi .................. B60K 6/24 701/22 |

OTHER PUBLICATIONS

Anonymous, "Intermediate Torque Transfer in 4-Element Power-On Downshift," IPCOM No. 000239992, Published Dec. 19, 2014, 2 pages.

\* cited by examiner

*Primary Examiner* — Derek D Knight
(74) *Attorney, Agent, or Firm* — Julia Voutyras; McCoy Russell LLP (57) ABSTRACT

A method and a system for improving operation of a hybrid vehicle are presented. In one example, an engine exhaust after treatment device is cooled at an opportunistic time. The approach may provide improved cooling for exhaust after treatment devices and it may also improve vehicle emissions.

10 Claims, 4 Drawing Sheets

METHOD AND SYSTEM FOR CONTROLLING CATALYST TEMPERATURE

CROSS REFERENCE TO RELATED APPLICATIONS

The present application is a continuation of U.S. patent application Ser. No. 13/663,723, "METHOD AND SYSTEM FOR CONTROLLING CATALYST TEMPERATURE," filed on Oct. 30, 2012, the entire contents of which are hereby incorporated by reference for all purposes.

FIELD

The present description relates to a system and methods for improving hybrid vehicle after treatment device temperature control during and after high load conditions. The method and system may be particularly useful for engines that are selectively coupled to an electrical machine and a transmission.

BACKGROUND AND SUMMARY

Engine exhaust temperature and after treatment device temperature may rise to undesirable levels when the engine is operated at high loads for an extended period of time. If exhaust temperature and after treatment device temperature are permitted to increase without bound, after treatment device degradation and engine degradation may occur. One way to limit engine exhaust and after treatment device temperature is to richen an air-fuel ratio supplied to the engine. The additional fuel carries heat from the engine cylinders and exhaust system components to the tailpipe so that the cylinders and the exhaust system temperature may be reduced. However, operating an engine with a rich air-fuel mixture can reduce vehicle fuel economy and may increase vehicle emissions.

The inventors herein have recognized the above-mentioned issues and have developed a method for operating a hybrid powertrain, comprising: opening a disconnect clutch and limiting a temperature that an exhaust after treatment device reaches via an action in response to a desired torque being less than the threshold torque and an after treatment device temperature.

By opportunistically opening a disconnect clutch during conditions where desired torque is at a lower level, it may be possible to cool an engine and exhaust after treatment devices at a higher rate without having to operate the engine with a rich air-fuel mixture. For example, a DISG may provide a desired torque during conditions where desired torque is low, while at the same time, the engine may be operated at a higher engine speed and a reduced cylinder air charge per cylinder cycle to cool engine and exhaust system components. Further, the engine may be operated at a stoichiometric air-fuel ratio during at least a portion of such conditions so that exhaust after treatment device efficiency may be improved while the after treatment device is being cooled.

The present description may provide several advantages. Specifically, the approach may increase after treatment device cooling during selected conditions. Additionally, the approach may reduce engine emissions while after treatment device temperature is decreasing.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
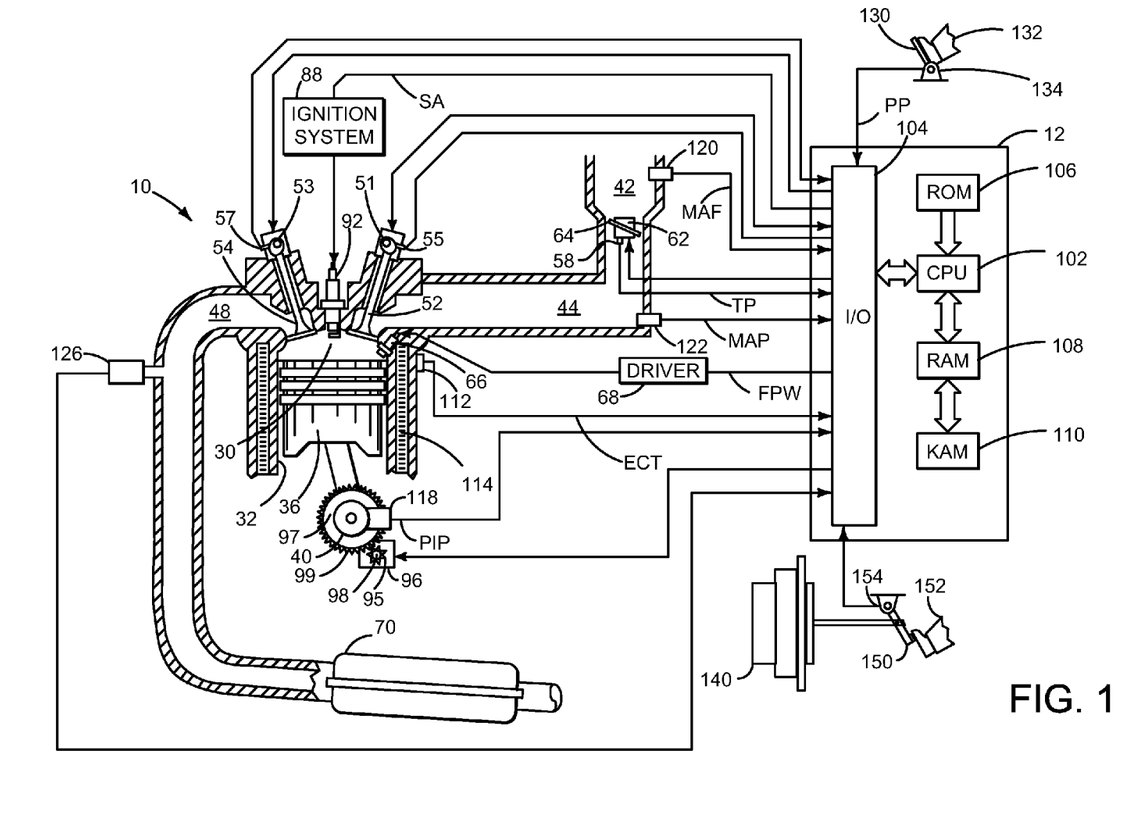
FIG. 1 is a schematic diagram of an engine.
Figure 2:
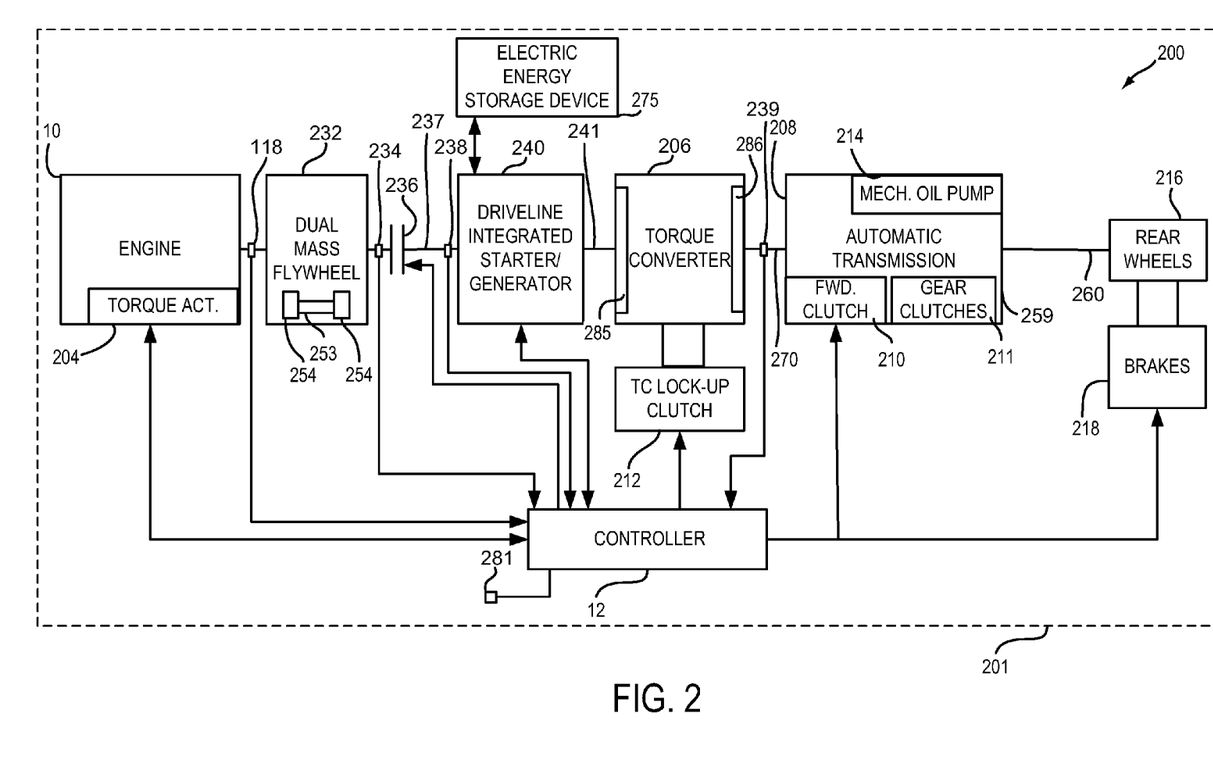
FIG. 2 shows an example vehicle and vehicle driveline configuration.

The present description is related to controlling engine and exhaust system temperature for a hybrid vehicle powertrain. The hybrid vehicle may include an engine and electric machine as shown in FIGS. 1-2. The engine may be operated with or without a driveline integrated starter/generator (DISG) during vehicle operation. The driveline integrated starter/generator is integrated into the driveline on the same axis as the engine crankshaft and rotates whenever the torque converter impeller rotates. Further, the DISG may not be selectively engaged or disengaged from the driveline. Rather, the DISG is an integral part of the driveline. Further still, the DISG may be operated with or without operating the engine. The mass and inertia of the DISG remain with the driveline when the DISG is not operating to provide or absorb torque from the driveline. The hybrid vehicle may operate as provided in FIG. 3 according to the method of FIG. 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70 (e.g., an exhaust after treatment device). Alternatively, a two-state exhaust gas oxygen sensor may be substituted for UEGO sensor 126.

Vehicle wheel brakes or regenerative braking via a DISG may be provided when brake pedal 150 is applied via foot 152. Brake pedal sensor 154 supplies a signal indicative of brake pedal position to controller 12. Foot 152 is assisted by brake booster 140 applying vehicle brakes.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. Engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 201 and vehicle driveline 200. Driveline 200 may be powered by engine 10. Engine 10 may be started with an engine starting system shown in FIG. 1 or via DISG 240. Further, engine 10 may generate or adjust torque via torque actuator 204, such as a fuel injector, throttle, etc.

An engine output torque may be transmitted to an input side of dual mass flywheel (DMF) 232. Engine speed as well as dual mass flywheel input side position and speed may be determined via engine position sensor 118. Dual mass flywheel 232 may include springs 253 and separate masses 254 for dampening driveline torque disturbances. The output side of dual mass flywheel 232 is shown being mechanically coupled to the input side of disconnect clutch 236. Disconnect clutch 236 may be electrically or hydraulically actuated. A position sensor 234 is positioned on the disconnect clutch side of dual mass flywheel 232 to sense the output position and speed of the dual mass flywheel 232. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output power capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236. Torque converter 206 includes a turbine 286 to output torque to transmission input shaft 270. Transmission input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission. Torque converter turbine speed and position may be determined via position sensor 239. In some examples, 238 and/or 239 may be torque sensors or may be combination position and torque sensors.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to rear wheels 216 to propel the vehicle via output shaft 260. Specifically, automatic transmission 208 may transfer an input driving torque at the input shaft 270 responsive to a vehicle traveling condition before transmitting an output driving torque to the rear wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or torque converter lock-up clutch 212. Mechanical oil pump 214 may be operated in accordance with torque converter 206, and may be driven by the rotation of the engine or DISG via input shaft 241, for example. Thus, the hydraulic pressure generated in mechanical oil pump 214 may increase as an engine speed and/or DISG speed increases, and may decrease as an engine speed and/or DISG speed decreases.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art. Controller 12 also receives driving surface grade input information from inclinometer 281.

When idle-stop conditions are satisfied, controller 42 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate the engine by resuming combustion in engine cylinders.

Thus, the system of FIGS. 1 and 2 provides for a hybrid powertrain system, comprising: an engine; a DISG; a disconnect clutch positioned in a vehicle driveline between the engine and the DISG; and a controller including instructions to open the disconnect clutch in response to a temperature of an after treatment device. The hybrid powertrain system, further comprises additional instructions to adjust engine air mass responsive to road grade while the disconnect clutch is open. The hybrid powertrain system, further comprises additional instructions to adjust engine air mass responsive to DISG torque while the disconnect clutch is open. The hybrid powertrain system further comprises additional instructions to adjust engine air mass responsive to a time since a desired torque is less than a threshold torque.

Figure 3:
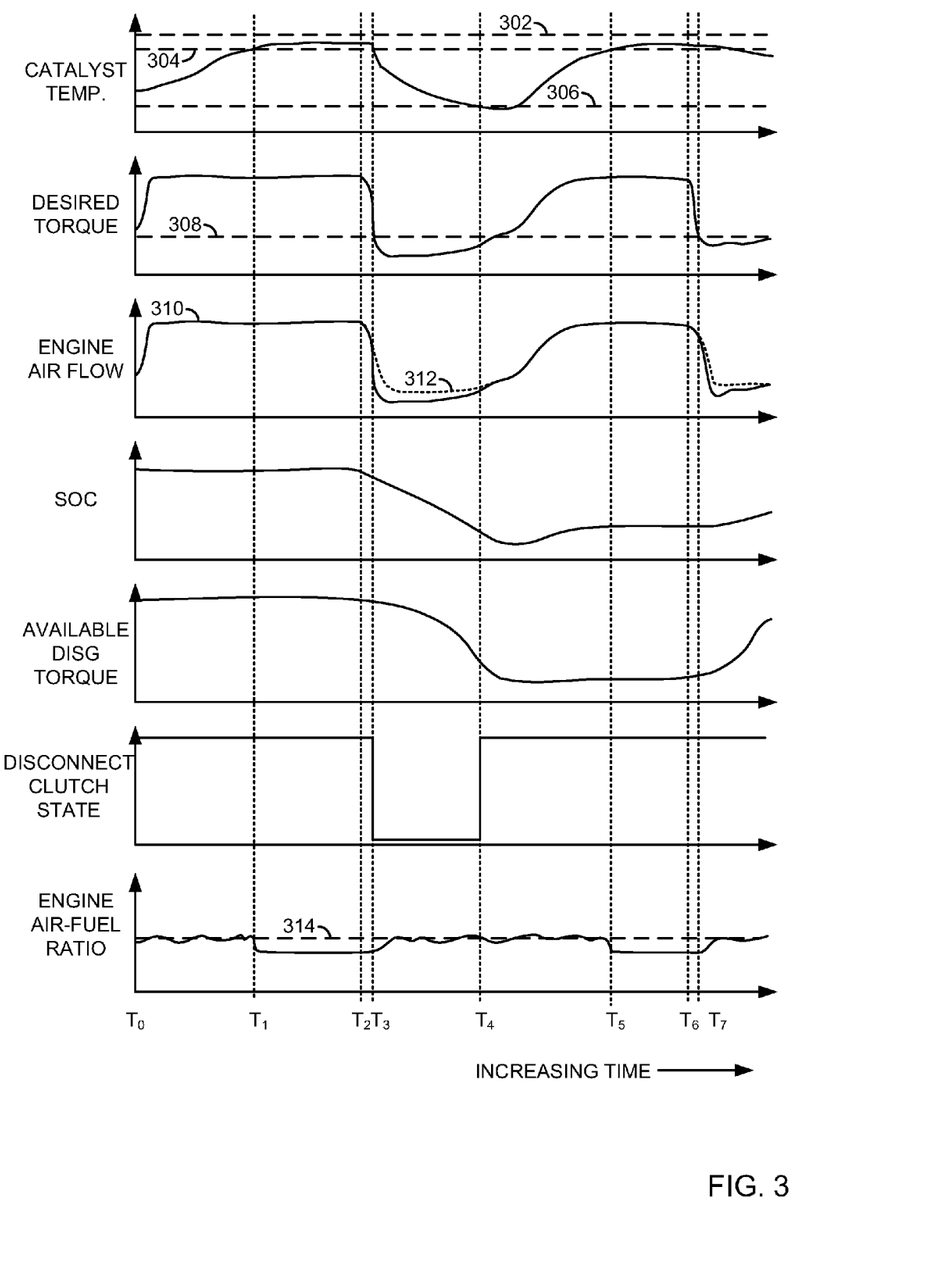
FIG. 3 shows a prophetic hybrid powertrain operating sequence.

Referring now to FIG. 3, an example prophetic vehicle operating sequence is shown. The sequence of FIG. 3 shows a method for reducing engine and exhaust system temperatures during periods of low desired engine torque following periods of high desired engine torques. The sequence of FIG. 3 may be provided via the method of FIG. 4 and the system of FIGS. 1 and 2. The first plot from the top of FIG. 3 shows catalyst temperature versus time. Catalyst temperature represents a temperature of catalyst 70 described in FIG. 1. Catalyst temperature increases in the direction of the Y axis arrow. Time increases in the direction of the X axis arrow. Horizontal line 302 represents a desired upper limit for catalyst temperature. Horizontal line 304 represents a catalyst temperature where control actions are performed to limit catalyst temperature. Horizontal line 306 represents a catalyst temperature where control actions to limit catalyst temperature cease after catalyst temperature exceeded the temperature that is represented by horizontal line 304.

The second plot from the top of FIG. 3 shows desired torque versus time. Desired torque may be based on a position of an accelerator pedal. The accelerator pedal position is converted to a desired engine torque, torque converter impeller torque, torque converter turbine torque, or wheel torque. Desired torque increases in the direction of the Y axis arrow. Time increases in the direction of the X axis arrow. Horizontal line 308 represents a desired torque below which control actions may be taken to reduce catalyst temperature after catalyst temperature exceeds the catalyst temperature represented by horizontal line 304.

The third plot from the top of FIG. 3 shows engine air flow versus time. Engine air flow amount increases in the direction of the Y axis arrow. Time increases in the direction of the X axis arrow. The solid trace 310 represents engine air flow not according to the method of FIG. 4. The dashed trace 312 represents engine air flow when the method of FIG. 4 adjusts engine and exhaust after treatment temperature. The engine air flows are equal when only solid trace 310 is visible.

The fourth plot from the top of FIG. 3 shows energy storage device state of charge (SOC) versus time. The energy storage device may supply or store power from the DISG. The SOC increases in the direction of the Y axis arrow. Time increases in the direction of the X axis arrow.

The fifth plot from the top of FIG. 3 shows available DISG torque versus time. The available DISG torque increases in the direction of the Y axis arrow. Time increases in the direction of the X axis arrow.

The sixth plot from the top of FIG. 3 shows a disconnect clutch state versus time. The disconnect clutch state is open when the disconnect clutch state is at a higher level. The disconnect clutch state is closed when the disconnect clutch state is at a lower level. Time increases in the direction of the X axis arrow.

The seventh plot from the top of FIG. 3 shows engine air-fuel ratio versus time. The engine air-fuel ratio increases in the direction of the Y axis arrow. Time increases in the direction of the X axis arrow. Horizontal line 314 represents a stoichiometric air-fuel ratio. A rich air-fuel mixture is shown when the engine air-fuel trace is below horizontal line 314. A lean air-fuel mixture is shown when the engine air-fuel trace is above horizontal line 314.

At time $T_0$, the engine is operating with a medium engine air flow and desired torque. The catalyst temperature is at a middle level below the threshold temperature at 304. The energy storage device SOC is at a higher level and the available DISG torque is at a higher level since the energy storage device SOC is high. The disconnect clutch is closed and the engine air-fuel ratio is near a stoichiometric air-fuel ratio.

Between time $T_0$ and time $T_1$, the desired torque and engine air flow are increased in response to an increasing driver demand torque. The catalyst temperature begins to increase as the desired torque increases. The energy storage device SOC is at a higher level and the available DISG torque is also at a higher level. The disconnect clutch remains closed and the engine operates about a stoichiometric air-fuel ratio.

At time $T_1$, the catalyst temperature reaches a catalyst temperature 304 where control actions are taken to reduce engine and exhaust after treatment device temperature. The desired engine torque remains at a higher level as does the engine air flow. In some examples, engine air flow may be reduced below maximum engine air flow to control engine exhaust gas temperature. The energy storage device SOC remains at a higher level as does the available DISG torque. The disconnect clutch remains closed so that engine power may be directed to vehicle wheels. The engine air-fuel ratio is enriched as a way to cool engine exhaust gas temperatures. Consequently, catalyst temperature remains below the desired catalyst temperature upper limit 302 between time $T_1$ and time $T_2$.

At time $T_2$, the desired torque is reduced in response to a driver releasing an accelerator pedal, for example. Alternatively, desired torque may be reduced in response to a controller demand. The engine air flow is reduced in response to the driver reducing the desired torque. The SOC remains at a higher level as does the available DISG torque. The disconnect clutch remains closed and the engine air-fuel ratio remains enriched.

At time $T_3$, the desired torque is reduced to a level below the level indicated by horizontal line 308 in response to a driver demand. As a result, the engine air flow is increased over a base engine air flow as indicated by the difference between trace 312 and trace 310 so that heat may be drawn from the engine and exhaust system components at a higher rate via the additional mass flow rate passing through the engine and exhaust system. The engine exhaust gas temperature is reduced by lowering the engine load. The engine air mass flow rate is increased over the base engine air flow when engine load is reduced via increasing engine speed over a desired base engine speed. The engine speed is adjusted in response to desired torque being less than desired torque level 308. The disconnect clutch transitions to an open state in response to desired torque being below desired torque level 308 so that the engine may be operated at a speed that is asynchronous to DISG speed. Further, the engine air-fuel is ramped to the stoichiometric air-fuel ratio in response to desired torque being below desired torque level 308 so that engine emissions may be reduced and so that catalyst efficiency may be increased.

It should be noted that the engine air flow rate may be adjusted responsive to a time since engine torque is reduced below a threshold torque, DISG torque, road grade, and other similar parameters. Thus, engine air flow rate may change when catalyst temperature is being reduced at an accelerated rate.

Between time $T_3$ and time $T_4$, the desired torque is provided by the DISG. Consequently, the SOC begins to be reduced since the DISG is consuming electrical power from the energy storage device. The disconnect clutch also remains in an open state so as to decouple the engine from the DISG.

At time $T_4$, the catalyst temperature has decayed to a value below the level indicated by threshold level 306. The engine air flow is reduced so that it matches the base engine air flow in response to catalyst temperature, and desired torque begins to increase in response to an increasing driver demand. The disconnect clutch is closed in response to catalyst temperature decreasing below threshold level 306 and the engine is recoupled to the DISG. The engine is operated with a stoichiometric air-fuel ratio.

Between time $T_4$ and time $T_5$, desired torque increases in response to an increasing driver demand. Engine air flow increases in response to increasing desired torque. Catalyst temperature also begins to increase in response to the increased desired torque and increasing engine air flow. The energy storage device SOC begins to slowly increase and the available DISG torque is at a low level in response to the low SOC. The DISG begins to convert engine torque to electrical energy and to charge the energy storage device in response to closing the disconnect clutch.

At time $T_5$, the catalyst temperature reaches threshold temperature 304 in response to the increased driver demand and desired torque. Consequently, the engine air fuel ratio is richened to control engine exhaust gas temperature. The disconnect clutch remains in a closed state and SOC stops increasing in response to the desired torque so that substantially all engine torque may be delivered to vehicle wheels. In particular, the DISG stops generating electrical energy.

At time $T_6$, the desired torque is reduced in response to a decrease in driver demand. Alternatively, desired torque may be reduced in response to a controller demand. The engine air flow is also reduced in response to the reduced desired torque. The SOC remains at a lower level as does the available DISG torque. The engine also continues to combust rich air-fuel mixtures.

At time $T_7$, desired torque is reduced to a level below threshold 308 in response to driver demand. Engine air flow is increased above a base desired engine air flow to cool engine exhaust gas and cylinder load is reduced. Engine air flow is increased via increasing engine speed over a desired base engine speed. However, the disconnect clutch is not opened as shown at time $T_3$ in response to the low SOC and available DISG torque. In this way, the engine and the DISG are rotated synchronously when the DISG does not have the capacity to provide the desired torque. Rather, engine speed is somewhat constrained by vehicle speed and transmission gear selection. Thus, the disconnect clutch may not be adjusted to an open state to control catalyst temperature during some conditions.

Figure 4:
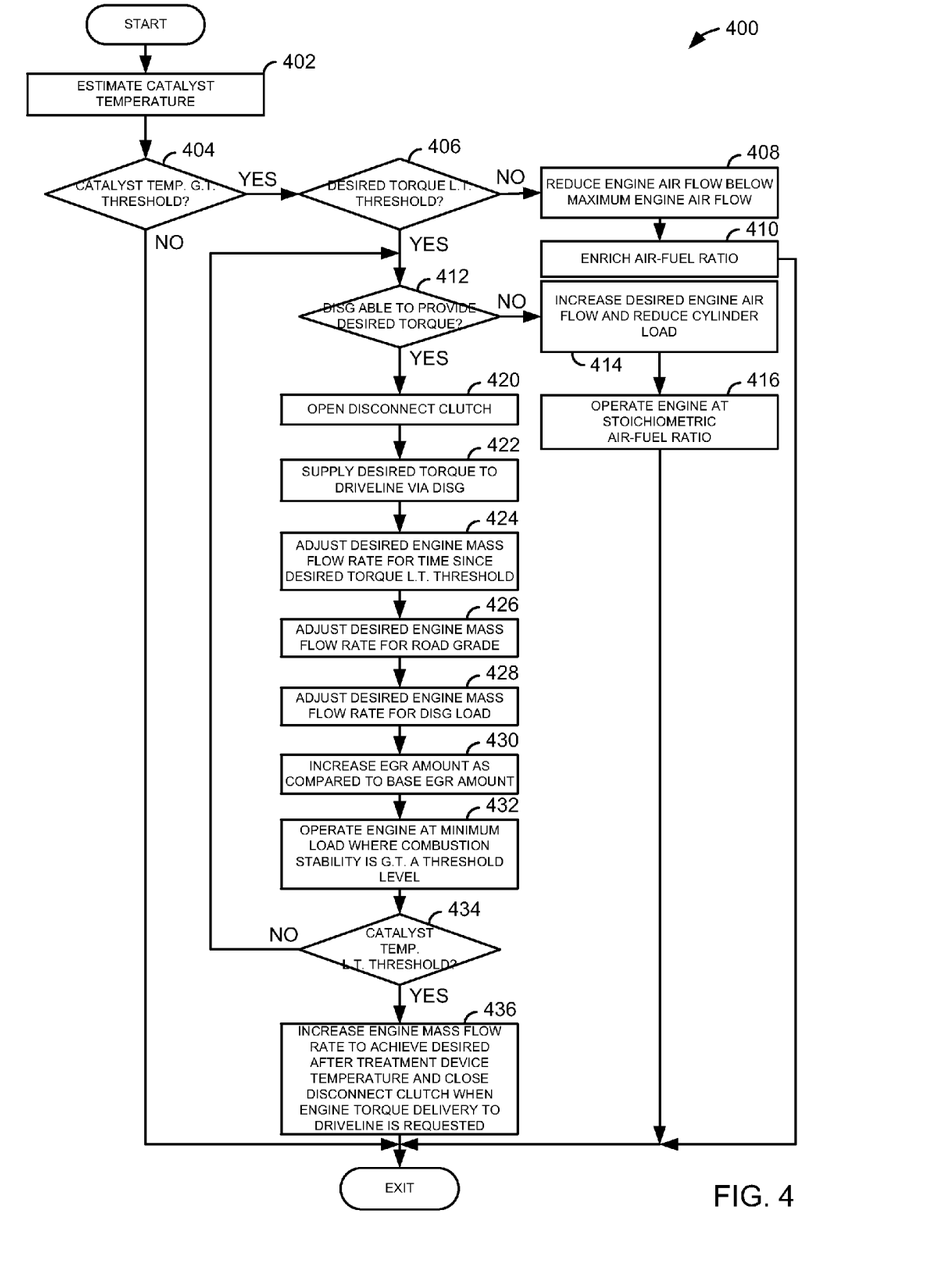
FIG. 4 shows an example method for operating a hybrid powertrain.

Referring now to FIG. 4, an example method for controlling catalyst temperature is shown. Method 400 may be stored as executable instructions in non-transitory memory of a controller as shown in FIGS. 1 and 2. Further, method 400 may provide the signals shown in FIG. 3.

At 402, method 400 estimates catalyst temperature. Catalyst temperature may be estimated based on engine speed, engine load, engine air-fuel ratio, engine intake air temperature as is known in the art. Method 400 proceeds to 404 after catalyst temperature is estimated.

At 404, method 400 judges whether or not catalyst temperature is greater than a threshold temperature. Catalyst temperature may be measured or inferred from engine air mass flow, air-fuel ratio, ambient air temperature, and engine speed. If method 400 judges that catalyst temperature is greater than a threshold temperature, method 400 proceeds to 406. Otherwise, method 400 proceeds to exit.

At 406, method 400 judges whether or not desired torque is less than a threshold torque. In one example, desired torque may be inferred from a position of an accelerator pedal. If method 400 judges that desired torque is less than a threshold torque, method 400 proceeds to 412. Otherwise, method 400 proceeds to 408. At 408, method 400 reduces engine air flow below a maximum engine air flow. Engine air flow may be reduced via adjusting a turbocharger waste gate, valve timing, and/or throttle position. By reducing the engine air flow, cylinder pressures may be reduced so that exhaust gas temperature is reduced. Method 400 proceeds to 410 after engine air flow is reduced.

At 410, method 400 enriches an engine air-fuel ratio. In one example, the engine air fuel ratio may be enriched to less than 12:1. By enriching the engine air-fuel mixture, an increased amount of heat may be carried from the engine and exhaust system to the tail pipe via fuel that has not been completely combusted. Method 400 proceeds to exit after the engine air-fuel ratio is adjusted.

At 412, method 400 judges whether or not the DISG has the capacity to provide the desired level of torque. Further, method 400 may judge whether or not the DISG may provide the desired level of torque for a predetermined amount of time. In one example, it may be judged that the DISG may provide the desired level of torque based on a voltage of a battery or other energy storage device. If method 400 judges that the DISG does not have the capacity to provide the desired level of torque for a predetermined amount of time, method 400 proceeds to 414. Otherwise, method 400 proceeds to 420.

At 414, method 400 increases a desire engine air flow above a base engine air flow, and method 400 reduces the cylinder air amount during a cycle of the cylinder. In other words, method 400 increases desired engine air flow and decreases engine load. In one example, engine air flow is increased while cylinder load is decreased via increasing engine speed. In particular, engine air flow increases as the number of cylinder cycles increases and the cylinder load decreases. Decreasing the cylinder load decreases cylinder pressure and temperature, and increasing the number of cylinder cycles per unit time increases the mass flow rate through the engine. Thus, more low temperature exhaust is pumped from the engine to cool exhaust valves, the engine exhaust manifold, and after treatment devices. Method 400 proceeds to 416 after increasing engine air flow and decreasing cylinder load.

Additionally, if the driveline disconnect clutch is open at 414, it is closed so that the engine may provide the desired torque. In this way, the driveline state may be adjusted responsive to available DISG torque.

At 416, method 400 supplies a substantially stoichiometric air-fuel mixture (e.g., within ±0.5 air-fuel ratio) to engine cylinders. In some examples, the engine air-fuel ratio may be made leaner and to approach a stoichiometric mixture based on catalyst temperature. The engine air-fuel ratio is moved toward a stoichiometric air-fuel ratio to improve catalyst efficiency. Method 400 exits after engine air-fuel ratio is adjusted.

At 420, method 400 opens the driveline disconnect clutch. The driveline disconnect clutch is opened so that the engine may rotate at a speed that is different from DISG and driveline speed. Further, decoupling the engine from the DISG permits the DISG to provide a desired torque without having to provide torque to rotate the engine. Method 400 proceeds to 422 after the driveline disconnect clutch is opened.

At 422, method 400 supplies the desired torque via the DISG. Specifically, the energy storage device supplies electrical power to the DISG and the DISG provides torque to the vehicle driveline. The DISG output torque is adjusted in response to desired or driver demand torque. Method 400 proceeds to 424 after the DISG torque is adjusted.

At 424, method 400 adjusts the desired engine air mass flow rate in response to an amount of time since desired torque is less than a threshold torque. In one example, the desired engine air mass is increased above a base desired engine air mass for similar operating conditions absent elevated catalyst temperature. For example, at 0.2 seconds after desired torque is less than the threshold torque, 0.05 grams/sec is added to the base desired engine air mass. At 2 seconds after desired torque is less than the threshold torque, 0.025 grams/sec is added to the desired engine air mass. Thus, the desired engine air mass is initially increased to a higher air mass and then the air mass is reduced over time. Method 400 proceeds to 426 after engine air mass flow rate is adjusted.

At 426, method 400 adjusts desired engine air mass flow rate responsive to road grade. In one example, the engine air mass flow rate is increased as a positive road grade increases. Further, engine air mass flow rate is decreased as a negative road grade increases. By increasing or decreasing engine air mass flow responsive to road grade, method 400 increases or decreases the cooling rate of the engine and exhaust after treatment devices. For example, if a road grade is positive and increasing, method 400 may infer that the DISG may not be able to provide the desired torque for an extended period of time. Therefore, it may be desirable to increase the engine and after treatment device cooling rate so that the after treatment device reaches a desired temperature before the engine may provide torque to the driveline. Method 400 proceeds to 428 after the engine air mass flow rate is adjusted for road grade.

At 428, method 400 adjusts the desired engine air mass flow rate for DISG load. In one example, if the DISG is operating at a higher load, the desired engine air mass may be increased by a first amount so that the after treatment device may cool at a faster rate. If the DISG is operating at a lower load, the desired engine air mass may be increased by a second amount, the second amount less than the first amount, so that the after treatment device may cool at a lower rate. Method 400 proceeds to 430 after the desired engine air mass flow rate is adjusted for DISG load.

At 430, method 400 method 400 increases an engine exhaust gas recirculation (EGR) amount above a base EGR amount for similar engine operating conditions to slow the combustion burn rate. By slowing the combustion burn rate, it may be possible to further reduce exhaust gas temperatures. The EGR amount may be increased via adjusting a position of an EGR valve or via adjusting valve timing. For example, an amount of open intake and open exhaust valve overlap may be increased to increase the engine EGR amount. Method 400 proceeds to 432 after the engine EGR amount is adjusted.

At 432, method 400 operates the engine at a reduced load where combustion stability is greater than a threshold level. In one example, the engine or cylinder load (e.g., where load is a number between 0 and 1, and where 1 represents the theoretical air mass limit that may be inducted into a cylinder) is reduced to a minimum value where combustion stability is at the threshold level. Method 400 proceeds to 434 after the engine load is reduced.

It should be noted that the engine air mass flow rate may be increased while cylinder load is decreased by increasing engine speed. In this way, the engine pumps a larger amount air in an increased number of smaller individual cylinder air amounts during an engine cycle.

At 434, method 400 judges whether or not an after treatment device (e.g., a catalyst, particulate filter, lean NOx trap) temperature is less than a threshold temperature. If so, method 400 proceeds to 436. Otherwise, method 400 returns to 412.

At 436, method 400 increases the engine air mass flow rate to achieve a desired after treatment device temperature. The engine air mass flow rate may be increased via opening a throttle, adjusting cam timing, or via adjusting a boost pressure supplied to the engine. Additionally, method 400 closes the driveline disconnect clutch when engine torque delivery to the driveline is requested. Method 400 proceeds to exit after the engine air mass is increased to elevate the after treatment device temperature to a desired temperature where the after treatment device operates with a desired efficiency.

Thus, the method of FIG. 4 provides for a method for operating a hybrid powertrain, comprising: opening a disconnect clutch and limiting a temperature that an exhaust after treatment device reaches via an action in response to a desired torque being less than the threshold torque and an after treatment device temperature. The method further comprising increasing an engine air mass flow and decreasing cylinder air charge per cylinder cycle. The method includes where engine air mass flow is increased via increasing engine speed. The method further comprises adjusting the engine air mass flow in response to a time since a desired torque is less than a threshold torque. The method further comprises adjusting the engine air mass flow in response to a road grade. The method further comprises increasing an engine EGR amount.

The method of FIG. 4 also provides for operating a hybrid powertrain, comprising: limiting an exhaust after treatment device temperature via a first action in response to a desired torque that is greater a threshold torque; and opening a disconnect clutch and limiting the exhaust after treatment device temperature via a second action in response to the desired torque being less than the threshold torque. The method includes where the first action includes enriching an engine air-fuel mixture. The method includes where the first action includes reducing engine air flow to less than a maximum engine air flow. The includes where the second action includes increasing engine speed to a value greater than a base engine speed at similar engine operating conditions.

In another example, the method further comprises closing the disconnect clutch and adjusting an engine air mass flow rate to increase the exhaust after treatment device temperature in response to the exhaust after treatment device temperature being less than a threshold exhaust after treatment device temperature. The method includes where the second action includes increasing an engine air flow amount to an amount that is greater than a base engine air flow at similar engine operating conditions. The method includes where the similar engine operating conditions are at a same desired torque. The method includes where the second action further includes reducing a cylinder air charge per cylinder cycle.

In another example, the method of FIG. 4 includes a method for operating a hybrid powertrain, comprising: opening a disconnect clutch and limiting a temperature that an exhaust after treatment device reaches via an action in response to a desired torque being less than the threshold torque and an after treatment device temperature; and supplying a desired torque to a vehicle driveline via a DISG. The method further comprises closing the disconnect clutch in response to a capacity of the DISG to provide the desired torque. The method further comprises operating the engine at a stoichiometric air-fuel ratio after closing the disconnect clutch. The method further comprises increasing an engine air flow. The method further comprises decreasing a cylinder air charge per cylinder cycle. The method further comprises adjusting a DISG torque output in response to the desired torque.

As will be appreciated by one of ordinary skill in the art, methods described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the methods and sequences described herein may be included as executable instructions in non-transitory memory of a controller.

This concludes the description. The reading of it by those skilled in the art would bring to mind many alterations and modifications without departing from the spirit and the scope of the description. For example, 13, 14, 15, V6, V8, V10, and V12 engines operating in natural gas, gasoline, diesel, or alternative fuel configurations could use the present description to advantage.

The invention claimed is:

1. A method for operating a hybrid powertrain, comprising:
   limiting an exhaust after treatment device temperature via air-fuel ratio enrichment when engine torque is greater a threshold torque while a disconnect clutch is open; and
   opening the disconnect clutch and limiting the exhaust after treatment device temperature by reducing engine load and increasing engine speed when engine torque is less than the threshold torque.

2. The method of claim 1 wherein engine air-fuel ratio is less rich when engine torque is less than the threshold torque as compared to when engine torque is greater than the threshold.

3. The method of claim 1, where the reducing engine load includes reducing engine air flow to less than a maximum engine air flow.

4. The method of claim 2, wherein less rich includes stoichiometric.

5. The method of claim 1, further comprising closing the disconnect clutch and adjusting an engine air mass flow rate to increase the exhaust after treatment device temperature in response to the exhaust after treatment device temperature being less than a threshold exhaust after treatment device temperature.

6. The method of claim 1, where the disconnect clutch is between an engine and an integrated starter/generator.

7. The method of claim 6, where a dual mass flywheel is coupled between the engine and the disconnect clutch.

8. The method of claim 6, wherein a torque converter is coupled between a transmission and the integrated starter/generator.

9. The method of claim 1 further comprising driving a vehicle via an electric machine coupled to a transmission and a vehicle wheel.

10. The method of claim 9 wherein the electric machine provides torque responsive to a driver request with the disconnect clutch open.

\* \* \* \* \*